United States Patent
Eslami-Nejad et al.

(10) Patent No.: US 11,181,302 B2
(45) Date of Patent: Nov. 23, 2021

(54) MULTI-CHANNEL GROUND HEAT EXCHANGE UNIT AND GEOTHERMAL SYSTEM

(71) Applicant: Her Majesty the Queen in Right of Canada as Represented by the Minister of Natural Resources Canada, Ottawa (CA)

(72) Inventors: Parham Eslami-Nejad, Montreal (CA); Mohamed Ouzzane, Dorval (CA); Claude Guay, Montreal (CA); Messaoud Badache, Montreal (CA)

(73) Assignee: Her Majesty the Queen in Right of Canada as Represented by the Minister of Natural Resources Canada, Ottawa (CA)

( * ) Notice: Subject to any disclaimer, the term of this patent is extended or adjusted under 35 U.S.C. 154(b) by 61 days.

(21) Appl. No.: 16/080,199

(22) PCT Filed: Feb. 9, 2018

(86) PCT No.: PCT/CA2018/050148
§ 371 (c)(1),
(2) Date: Aug. 27, 2018

(87) PCT Pub. No.: WO2018/145210
PCT Pub. Date: Aug. 16, 2018

(65) Prior Publication Data
US 2020/0393166 A1 Dec. 17, 2020

Related U.S. Application Data

(60) Provisional application No. 62/457,439, filed on Feb. 10, 2017.

(51) Int. Cl.
*F28D 17/00* (2006.01)
*F24T 10/15* (2018.01)
(Continued)

(52) U.S. Cl.
CPC ............ *F24T 10/15* (2018.05); *F28D 7/06* (2013.01); *F28F 21/062* (2013.01); *F24T 2010/53* (2018.05)

(58) Field of Classification Search
CPC ......... F24T 10/15; F24T 2010/53; F28D 7/06; F28F 21/062
(Continued)

(56) References Cited

U.S. PATENT DOCUMENTS 5,630,572 A * 5/1997 Guay ................... E04H 4/06
256/1
8,468,845 B2 * 6/2013 Chordia ................ F25B 9/008
62/260

(Continued)

FOREIGN PATENT DOCUMENTS

CH 658513 A5 11/1986
EP 0045993 A1 2/1982
(Continued)

OTHER PUBLICATIONS

Nov. 19, 2020—(EP) Extended European Search Report—Appl No. 18751367.6.
(Continued)

*Primary Examiner* — Claire E Rojohn, III
(74) *Attorney, Agent, or Firm* — Banner & Witcoff, Ltd.

(57) ABSTRACT

Geothermal energy is increasingly recognized as a useful energy source for both industrial and residential purposes. Disclosed herein are units for subterranean heat exchange comprising a polymer block with 'mini-channels' adapted and/or sized for highly efficient heat exchange. In some embodiments such units can, as needed, be manufactured off site, spooled for transport, and conveniently installed in boreholes. Other arrangements are also described for conduits located within a borehole for heat exchange, without a (Continued)

polymer block. Also disclosed are geothermal heat exchange systems including those that employ such units, for example with direct expansion of a two-phase heat-exchange fluid such as carbon dioxide.

18 Claims, 10 Drawing Sheets

(51) Int. Cl.
F28D 7/06 (2006.01)
F28F 21/06 (2006.01)
F24T 10/00 (2018.01)

(58) Field of Classification Search
USPC .......................................................... 165/45
See application file for complete search history.

(56) References Cited

U.S. PATENT DOCUMENTS

| 2007/0102138 A1* | 5/2007 | Kadota | F28D 15/0266 165/47 |
| 2009/0025902 A1* | 1/2009 | Favier | F24T 10/15 165/45 |
| 2010/0243209 A1* | 9/2010 | Ojala | F28F 13/12 165/104.19 |
| 2011/0198054 A1* | 8/2011 | Viernickel | F24T 10/20 165/45 |
| 2011/0203765 A1* | 8/2011 | Jensen | F16L 9/19 165/45 |
| 2012/0103559 A1* | 5/2012 | Fernandez | F24T 10/10 165/45 |
| 2013/0232973 A1* | 9/2013 | McBay | F28D 20/0034 60/641.2 |
| 2014/0311174 A1* | 10/2014 | Wiggs | F24T 10/15 62/260 |
| 2020/0088447 A1* | 3/2020 | Reitsma | B26D 1/30 |
| 2020/0190937 A1* | 6/2020 | Nevison | E21B 33/14 |

FOREIGN PATENT DOCUMENTS

| EP | 2913607 A2 | 9/2015 |
| FR | 2933171 A1 | 1/2010 |
| JP | 2006234340 A | 9/2006 |
| JP | 4928644 B1 | 5/2012 |
| WO | 00/71957 A1 | 11/2000 |
| WO | 2014/165826 A1 | 10/2014 |
| WO | 2015/114105 A2 | 8/2015 |

OTHER PUBLICATIONS

Aug. 13, 2019 (WO)—International Preliminary Report on Patentability PCT/CA2018/050148.

* cited by examiner

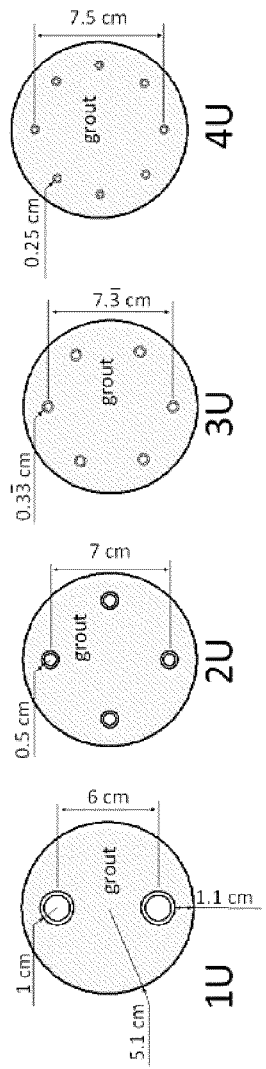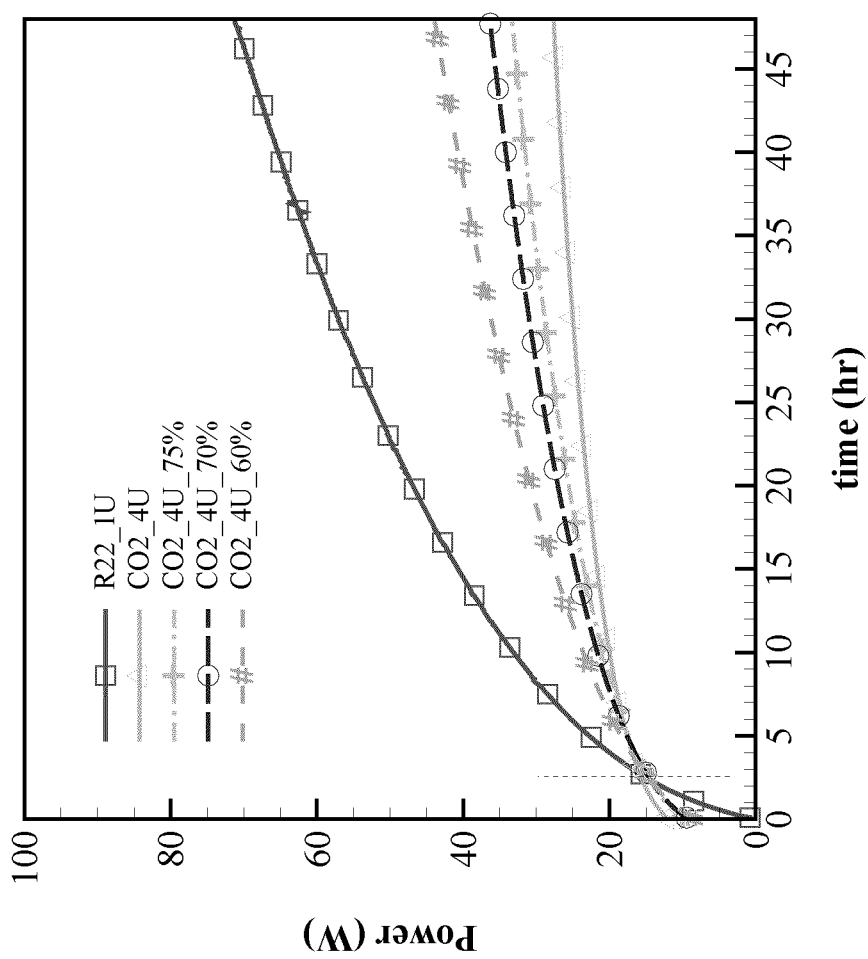
FIG. 7b

MULTI-CHANNEL GROUND HEAT EXCHANGE UNIT AND GEOTHERMAL SYSTEM

RELATED APPLICATION DATA

This application is a National Stage Application under 35 U.S.C. 371 of co-pending PCT application number PCT/CA2018/050148 designating the United States and filed Feb. 9, 2018; which claims the benefit of US Provisional application number 62/457,439 and filed Feb. 10, 2017 each of which are hereby incorporated by reference in their entireties.

PRIORITY BENEFIT

This application claims the priority benefit of U.S. patent application 62/457,439 filed Feb. 10, 2017.

FIELD

The invention relates to the field of geothermal energy, in particular geo-exchange technology, and specifically to ground or subterranean geo-exchange systems for heating and cooling, or otherwise for supplying thermal energy, to a site or building above the surface of the ground.

BACKGROUND

Fossil fuel consumption continues to increase. The resulting carbon dioxide emissions in turn contribute to global warming, creating significant environmental concerns. Efforts to harness energy from renewable sources have achieved some success to reduce dependency upon fossil fuels. However, many sources of renewable energy are inconsistent or require the use of equipment or industrial processes with relatively high capital cost. For example, progress has been made in the conversion of solar and wind energy to other useable forms of energy, but the energy conversion efficiency remains poor, and the supply of solar or wind energy is very inconsistent for any given location.

Geothermal energy, by contrast, can provide a more reliable and consistent source of renewable, non-polluting energy in thermal form. In some locations it is possible to harness significant quantities of geothermal energy in areas of subterranean volcanic activity. Most commonly, however, the harnessing of geothermal energy by way of geo-exchange technology comprises heat exchange at or between relatively shallow ground layers (less than 300 m) at constant temperature by way of heat pumps or chiller units circulating a working fluid.

Typically, a geo-exchange closed-loop system is established in which a fluid is re-circulated through copper or polyethylene conduits from an above-ground heating/cooling load to a location beneath the ground. For example the loop may be connected to one or more heat pumps or chillers as integral parts of the loop, or within separate loops for exchanging a cooling/heating load with a medium beneath the ground. One or more loops are often placed in a generally vertical orientation, positioned within a borehole which is then back-filled with material to improve the secure positioning of the loops within the borehole, and thermal contact between the loops (and the fluid contained within them) and the subterranean material. The drilled boreholes are often quite large (typically 4 inches or greater in diameter) and the boreholes may be as deep as 100 to 400 feet deep. The cost to drill such boreholes is expensive, and may be prohibitively expensive for many residential applications. Furthermore, the need to backfill the boreholes following insertion of the loop(s) can lead to further problems. For example, improper backfilling can lead to voids between the loop(s) and the subterranean material, which in turn can cause a reduction of thermal performance or an increase (up to 50%) in thermal resistance between the thermal heat transfer liquid moving within the loops and the ground material.

Efforts have been made in the art to mitigate such problems. For example, back-fill materials have been developed with greater thermal conductivity. The use of multiple U-tubes has also been tested, although the proper positioning of multiple loops within a borehole may present a challenge to avoid negative thermal interactions between the loops and to ensure proper back-filling.

For illustration, FIG. 1 illustrates a schematic cross-section elevational view of a typical vertical geothermal borehole or subterranean heat exchanger consisting of one or two long plastic or metallic U-tubes embedded within the borehole in a solid material (grout or back-fill). This grout or back-fill maintains good thermal contact between the soil and the pipe(s) within which the heat exchange/thermal fluid is circulating, and has a secondary purpose of helping to avoid contamination of the ground water by surface water seeping from above.

Typically, subterranean heat exchangers are connected directly or through a separate loop to heat pumps or chillers, as shown for example in FIGS. 2a and 2b. FIG. 2a illustrates a typical direct-expansion system, whereas FIG. 2b illustrates a typical system with a separate/secondary loop. Such systems may be known as ground source heat pumps to provide heating and cooling for example to a building.

Without doubt there remains a need in the art to improve geothermal and geo-exchange systems, especially the cost to install such systems for smaller buildings such as small businesses and residential dwellings. Using current technologies, for a residential dwelling it may take 30 years to recover the geo-exchange system installation costs by way of reduced energy consumption in the home: for many property owners this is a cost recovery period that is simply too long to justify the installation expense. Furthermore, in geo-exchange technology there remains a need to improve the efficiency of thermal energy (heat) transfer from beneath the ground to the intended location, or otherwise the thermal fluid used, for heating or cooling of buildings. Only when such needs are resolved will geothermal energy systems become more main-stream, standard installations for homes and businesses.

SUMMARY

It is an object of selected embodiments to provide a geothermal heat exchange system, or components thereof.

In selected embodiments there is provided a subterranean heat exchange unit adapted for fluid connection to supply and return conduits containing a heat exchange fluid in a loop of a geothermal heat exchange system, the heat exchange unit comprising an elongate polymer block with a plurality of elongate channels extending within the block, each channel having a diameter of from 0.5 mm to 20 mm, each channel adapted for passage therethrough of the heat exchange fluid to and from the supply and return conduits.

Other embodiments provide a geothermal heat exchange system, comprising:

a subterranean heat exchange unit as herein described;

supply and return conduits connected to the unit for fluid flow between the channels of the unit and the conduits;

heat exchange fluid located within the channels of the unit, and the conduits;

a pump or compressor to pump or circulate the heat exchange fluid to and from the unit via the conduits to and from a heating/cooling load in a loop.

Other embodiments provide a method for heating or cooling an internal space of a building, comprising the steps of:

drilling at least one borehole into the ground;

installing in each borehole a heat exchange unit as described herein; and connecting the heat exchange unit(s) to supply and return conduits of a geothermal heat exchange system comprising one or more pump(s) or compressor(s) to pump or circulate a heat exchange fluid around a loop that includes the heat exchange unit(s) and the supply and return conduits.

Other embodiments provide a use of the geothermal heat exchange system as described herein, to heat or cool an internal space of a building.

Further embodiments provide a geothermal heat exchange system, comprising:

a plurality of subterranean heat exchange channels or conduits for fluid connection to supply and return feeds in a loop, the heat exchange conduits or channels each comprising at least a portion having a diameter of from 0.5 mm to 20 mm, each adapted for passage therethrough of the heat exchange fluid to and from the supply and return feeds;

heat exchange fluid located within channels or conduits;

a pump or compressor to pump or circulate the heat exchange fluid to and from the channels or conduits to and from a heating/cooling load in said loop.

In selected embodiments, any of the geothermal heat exchange units and systems as described herein may comprise a polymer block with heat exchange conduits or channels having a diameter of from 0.5 mm to 20 mm, or from 1 mm to 10 mm, or from 2 mm to 8 mm, or from 3 mm to 6 mm.

In selected embodiments, any of the geothermal heat exchange units and systems as described herein may optionally be configured to employ, and may comprise, a single phase, two-phase, or multi-phase heat exchange fluid as part of a phase-change heat exchange system. In this way, phase changes of the heat exchange fluid during the cycling of the fluid contribute to the heat exchange and thermal transfer characteristics of the system. One example of a suitable two-phase heat exchange fluid, suitable for use with some of the heat exchange units and systems as described here, is carbon dioxide. Evaporation and condensation of the heat exchange fluid as it is cycled through the heat exchange systems facilitates the desired transfer and exchange of thermal energy, sometimes without need for large changes in the temperature of the heat exchange fluid.

In further selected embodiments there is provided a use of a geothermal heat exchange unit or system as herein described, to heat or cool an internal space of a building.

In further selected embodiments there is provided a method of borehole, site-installation of a heat exchange unit as described herein, comprising the following steps:

providing a heat exchange unit as herein described, spooled onto a spool;

optionally, and if required, applying an end-cap to a first end of the polymer block, the end cap comprising channels for alignment with the channels of the polymer block, with U-shaped portions to provide fluid connection of the channels of the polymer block, thereby to form elongate U-shaped channels;

inserting the first end of the polymer block down into a borehole at the site to a desired depth;

optionally cutting the elongate polymer block above the ground;

connecting a second end of the polymer block to supply and return conduits of a heat exchange system, optionally by way of a conduit-connection cap, to provide fluid connection between the supply and return conduits and the channels running within the polymer block.

BRIEF DESCRIPTION OF THE DRAWINGS

FIG. 7b provides a graph to illustrate power required to compensate for pressure drop as a function of time, for a comparison between different conduit and thermal exchange fluid configurations, particularly for configurations comprising 4 U-shaped conduits with carbon dioxide as a thermal exchange fluid with variable reductions in heat exchange unit length.

DEFINITIONS

Figure 1:
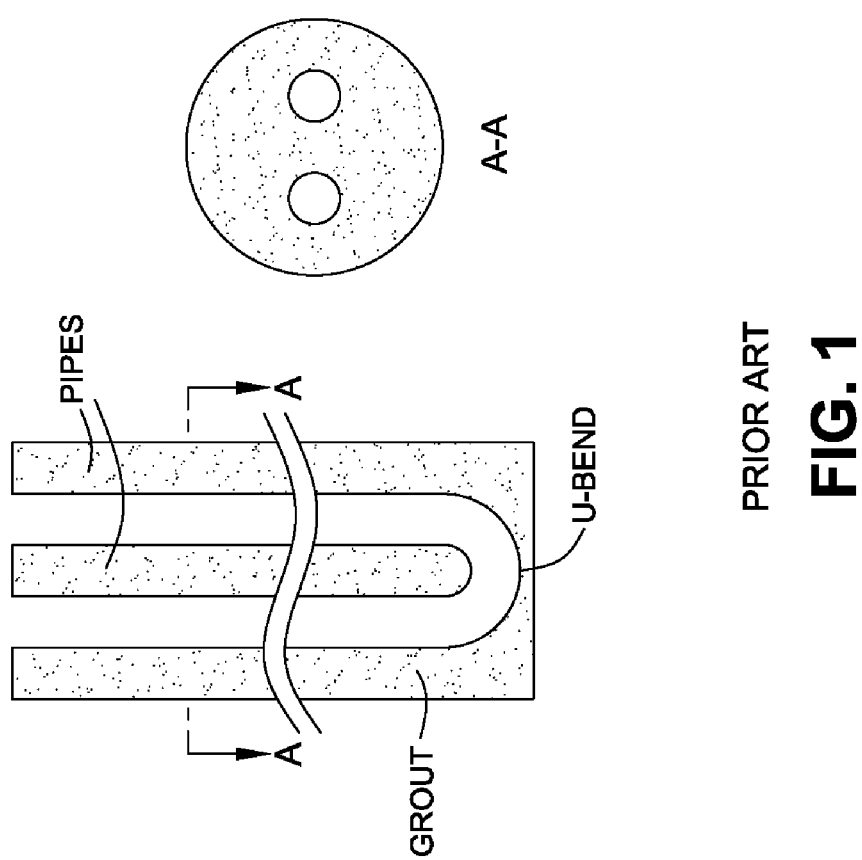
FIG. 1 provides a schematic side-elevation cross-sectional view, and corresponding horizontal cross-section along line A-A', of a convention vertical borehole and conduit arrangement for geothermal purposes.
Figure 2:
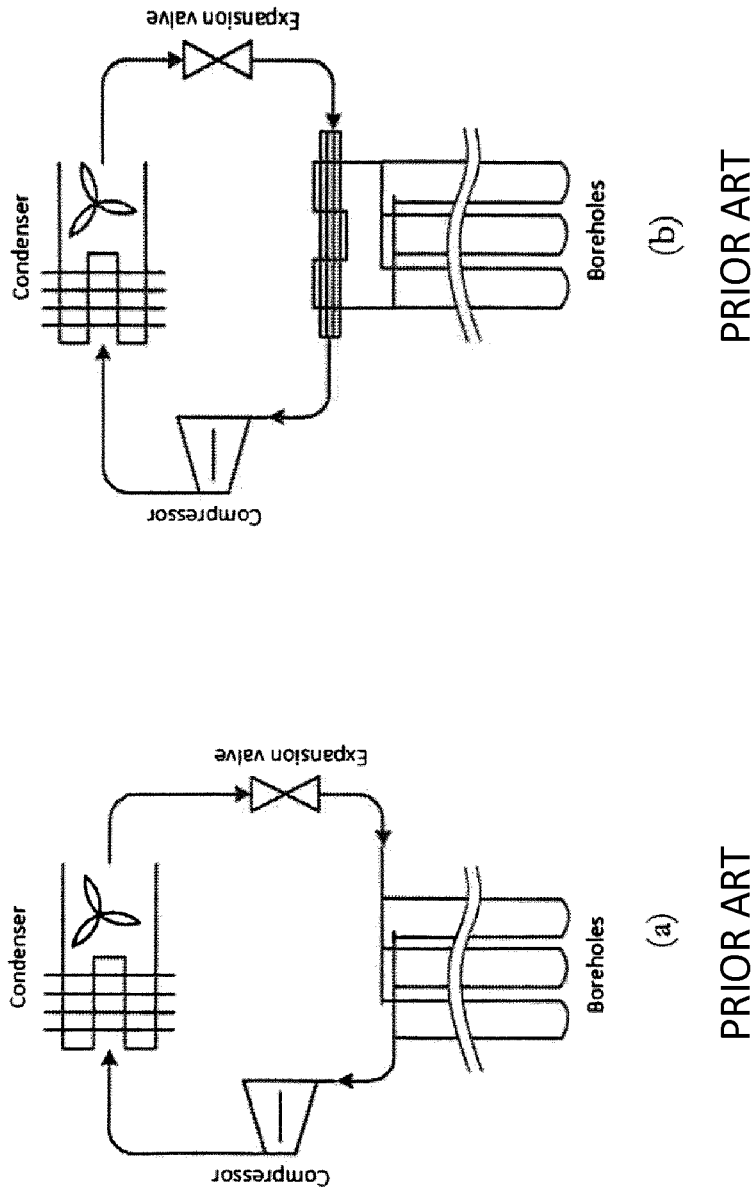
FIG. 2a provides a schematic representation of a typical ground source heat pump technology by direct expansion.
FIG. 2b provides a schematic representation of a typical ground source heat pump technology involving a secondary loop.

Channel: a tubular passage or duct for heat transfer fluid, that may or may not have a circular or elliptical cross-section. A channel may, in some contexts, also be referred to by other terms when referring to passageways present through a heat exchange block as herein described.

Conduit: a pipe or tube through which fluid passes.

Heat exchange unit/ground heat exchanger: refers to a functional unit, optionally self-contained, which may be flexible or elongate, that receives therethrough heat exchange fluid for the purposes of heat exchange, in particular ground heat exchange to and from the ground. In selected embodiments the unit may comprise a polymer block, with channels adapted to receive heat exchange fluid extending through the polymer block with entry and exit points for the fluid. Such polymer blocks may comprise any suitable polymer, for example selected from the following non-limiting group: a simple polymer material, Liquid Crystalline Polymer (LCP), polymer-metal composites, carbon fibre reinforced carbon composites, epoxy and phenol formaldehyde composites optionally reinforced by glass and carbon wires, polyamide composite materials optionally with Nano-carbon filaments and/or Nano-diamond particles.

Geothermal heat exchange system: refers to a system, also known herein as a geo-exchange system, that includes a heat exchange unit or heat exchange conduits, typically to retain heat exchange fluid in loop (e.g. a closed loop), a portion of which passes underground, with a pump to pump or move the fluid around the loop to and from another position above the ground, typically including a heating or cooling load within a building.

Heat exchange fluid: refers to any fluid suitable for use in a heat exchange unit or heat exchange system as described herein. Such fluids may be single phase or multi-phase fluids that change phase (e.g. from liquid to gas and vice versa) during each cycle through a closed or open loop of a heat-exchange system. For example, two-phase heat exchange fluids such as carbon-dioxide are suitable in selected embodiments due to the properties of carbon-dioxide for direct expansion, and because they are suitable for phase transition and corresponding transfer of thermal energy depending upon the position of the fluid in a closed loop of a heat exchange system.

Heating/cooling load: refers to any building with an internal space that has a temperature requirement to be changed or maintained relative to an external temperature. In other words, there is 'demand' from the building to maintain comfort or to condition the internal space.

DETAILED DESCRIPTION OF SELECTED EMBODIMENTS

To provide improvements or advances in geothermal energy extraction, herein disclosed are improvements or advancements in geothermal or subterranean heat exchange systems and their associated components.

The inventors have endeavored to develop ways to achieve at least one of: a reduction in the required borehole diameter for subterranean pipes and conduits associated with geothermal systems; a reduction in the borehole depth requirements for efficient heat-exchange; and an improvement in the efficiency of operation of geothermal systems e.g. for residential and/or small business use. To this end, selected embodiments provide for a subterranean heat exchange unit adapted for fluid connection to supply and return conduits containing a heat exchange fluid, such a two-phase or multi-phase heat exchange fluid, in a loop (e.g. a closed loop) of a geothermal heat exchange system. In such embodiments the heat exchange unit comprises an elongate polymer block with a plurality of elongate channels extending within the block, each channel having a diameter of from 0.5 mm to 20 mm (or from 1 mm to 10 mm, or from 2 mm to 8 mm, or from 3 mm to 6 mm) each channel adapted for passage therethrough of the heat exchange fluid to and from the supply and return conduits. These embodiments, and corresponding versions and variants, have been found to provide certain advantages as herein described.

In some embodiments the elongate channels include a U-shaped portion through the polymer block, and each have a diameter of from 0.5 mm to 20 mm (or from 1 mm to 10 mm, or from 2 mm to 8 mm, or from 3 mm to 6 mm), often from 2 mm to 8 mm (1/16" to 5/16"). Optionally, the channels are tubular passages that are generally circular in cross-section with a generally constant diameter along their length. In some embodiments there may be from 4 to 12 channels (e.g. tubular passages) for heat exchange fluid, a substantial portion of which run in parallel through at least most of the length of the polymer block, each ending in an orifice in a surface of the polymer block for distribution of the heat exchange fluid to the entry of the polymer block, and collection of the heat exchange fluid from the exit of the polymer block. In some configurations, the points of entry and exit of heat exchange fluid to and from the polymer block may be locate in substantially the same general surface at one end of the polymer block for convenient connection to supply and return conduits for heat exchange fluid in a loop of a geothermal heat exchange system.

The elongate polymer block, at least in some embodiments, has an average diameter of from 1 cm to 15 cm, or from 4 cm to 8 cm, for insertion into a borehole in the ground, the elongate channels extending at least substantially along a length of the polymer block. In other embodiments the polymer block has an average diameter of from 4 cm to 8 cm (1½" to 3"). Optionally, the polymer block has a length of from 1 m to 100 m, with the channels for heat exchange fluid extending within at least a majority of the length of the polymer block. Optionally, the lumens of the channels are arranged in a radially symmetrical manner when the polymer block is viewed in cross-section. Without being bound by theory, the inventors have found that the use of multiple 'smaller' or 'narrower' channels can lead to more efficient heat exchange and operation, at least in some embodiments.

For example, the channels in cross-section optionally may have a total combined cross-sectional area of from $0.5$ $cm^2$ to $15$ $cm^2$. However, the combined cross-sectional area of the channels will also be dependent upon borehole and conduit length. Moreover, optionally the polymer block comprises or consists of a polymer with a thermal conductivity (e.g. radial thermal conductivity) of from 1.0 to 10 W/m·K. As will be seen from subsequently presented data, such embodiments may present particular advantages in terms of heat exchange efficiency. Such polymer blocks may comprise any suitable polymer, for example but not limited to those selected from the following group: a simple polymer material, Liquid Crystalline Polymer (LCP), polymer-metal composites, carbon fibre reinforced carbon composites, epoxy and phenol formaldehyde composites optionally reinforced by glass and carbon wires, polyamide composite materials optionally with Nano-carbon filaments and/or Nano-diamond particles.

In certain embodiments of the heat exchange units disclosed herein, each of the elongate channels within the elongate polymer block has an entry and exit point for the heat exchange fluid at a first end of the elongate polymer block, each elongate channel having a U-shaped portion within the elongate polymer block located generally at or near a second end thereof. In this way, for example, when the polymer block is inserted down into a borehole in the ground, one end of the polymer block may be at, near, or protrude from the surface of the ground with all entry and exit points for the conduits or channels present at the one end for connection to other elements of a geothermal heat exchange system, such as supply and return conduits, thereby to create a loop for cycling of heat exchange fluid.

In still further embodiments, the polymer block comprises a flexible polymer such that the unit can be wound or coiled for transport or storage prior to installation at a site for the geothermal heat exchange system. An example of such a configuration will be described in more detail below with reference to FIG. 8.

In selected embodiments the elongate channels may extend a length of the polymer block, with exit orifices for each channel at opposite ends of the polymer block. In such circumstances the unit may further comprising an end cap fitted at one end of the polymer block, the end-cap comprising U-shaped channels each to provide sealing fluid connection between two exit orifices of two elongate channels at the one end, so as to complete elongate channels each with a U-shaped portion and each with heat exchange fluid entry and exit points at an end of the polymer block opposite the end with the end-cap.

In other selected embodiments the unit may further comprise a conduit connection cap fitted to an end of the polymer block, for sealing fluid connection between exit orifices of the elongate channels of the polymer block to conduits, and comprising conduit connection points. In some such embodiments the conduit connection points of the conduit connection cap may comprise a single supply conduit connection point, and a single return conduit connection point. Again, such embodiments are described with greater clarity with respect to FIG. 8.

Still further embodiments provide a geothermal heat exchange system, comprising:
a subterranean heat exchange unit according to any such embodiment as described herein;
supply and return conduits connected to the unit for fluid flow between the channels of the unit and the conduits;
heat exchange fluid located within the channels of the unit(s), and the conduits;
a pump or compressor to pump or circulate the heat exchange fluid to and from the unit via the conduits to and from a heating/cooling load in a closed loop.

For example, in some embodiments the system is a direct-expansion geothermal heat exchange system, the heat exchange fluid adopting liquid and gaseous states at different positions within the closed loop. Optionally, the temperature of the heat exchange fluid varies by less than 5° C., or even less than 2° C., along the channel length as the fluid cycles around the closed loop. In some particular embodiments, the heat exchange fluid comprises carbon dioxide. As described in the examples below, the use of carbon dioxide with 'smaller' or 'narrower' channels for heat exchange may present further particular advantages.

Yet further embodiments provide for a geothermal heat exchange system, comprising:
subterranean heat exchange channels or conduits for fluid connection to supply and return feeds in a closed loop, the heat exchange conduits or channels each comprising at least a portion having a diameter of from 0.5 mm to 20 mm, each adapted for passage therethrough of the heat exchange fluid to and from the supply and return feeds;
heat exchange fluid located within channels or conduits;
a pump or compressor to pump the heat exchange fluid to and from the channels or conduits to and from a heating/cooling load in said closed loop.

Optionally, in such embodiments, the channels or conduits each comprise at least a portion having a diameter of from 1 mm to 10 mm, or from 2 mm to 8 mm, or from 3 mm to 6 mm. Optionally, in such embodiments, the heat exchange fluid comprises carbon dioxide.

In further embodiments, there is provided a method for heating or cooling an internal space of a building, comprising the steps of:
drilling at least one borehole into the ground;
installing in each borehole any heat exchange unit as described herein; and
connecting the heat exchange units to supply and return conduits of a geothermal heat exchange system comprising a pump or pumps to pump a heat exchange fluid around a closed loop that includes the heat exchange unit and the supply and return conduits.

Other embodiments provide for a use of any geothermal heat exchange system as described herein, to heat or cool an internal space of a building.

EXAMPLES

The following examples, with reference to the figures, are merely illustrative of certain embodiments and are not limiting in terms of scope to the appended claims.

Figure 3:
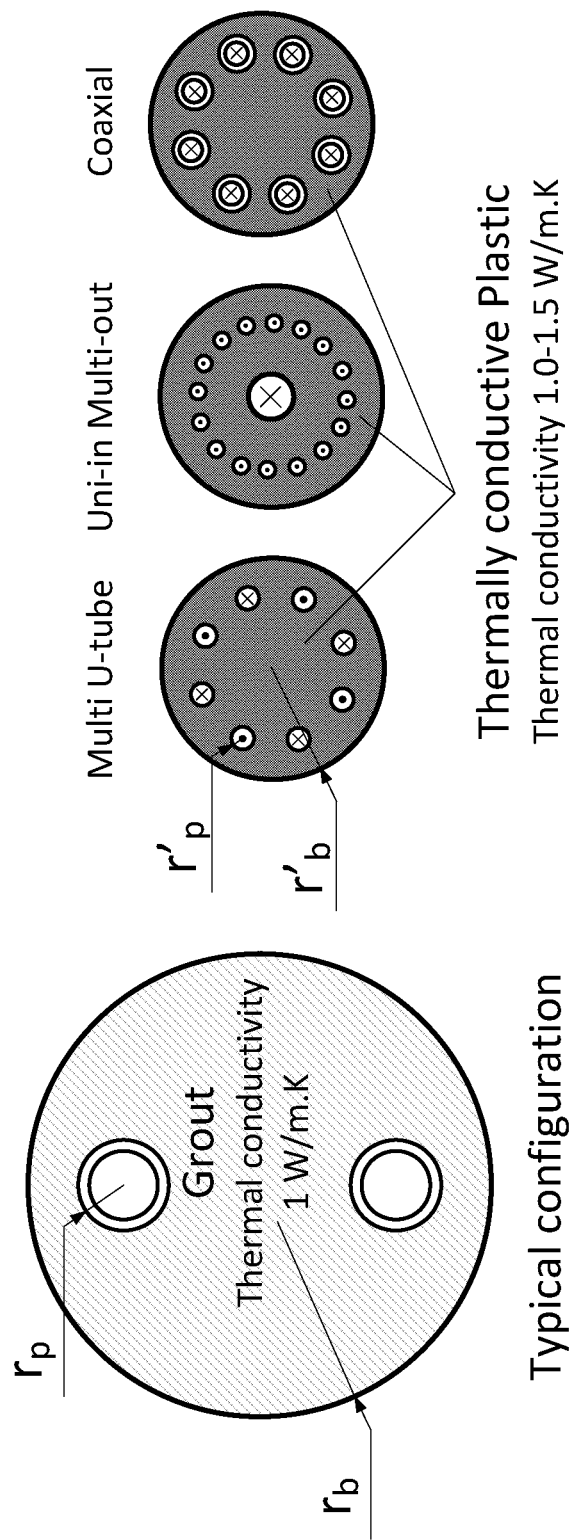
FIG. 3 provides a schematic cross-sectional representation of a typical prior art borehole configuration with a single conduit extending therethrough in a U-shaped arrangement (left); compared with schematic cross-sectional representations of example thermal exchange units comprised of thermally conductive polymer with different conduit/channel/channel configurations.

Example configurations of such heat exchange units comprising polymer blocks, shown in cross-section, are illustrated in FIG. 3. For comparison, on the left side of the figure is shown a typical configuration of the prior art, showing a borehole in cross-section back filled with grout, to surround two pipes or conduits that (in this example) are connected in a U-bend configuration (not shown). Therefore the pipes as illustrated in cross-section, surrounded by the grout, in fact form part of the same closed loop extending to and from a heat pump. Example embodiments of the present invention are shown in the right hand three cross-sectional illustrations of heat exchange units. These are smaller in cross-section than the more traditional borehole configuration shown at left of FIG. 3, and include a thermally conductive polymer through which runs a plurality of smaller channels or conduits. The example labeled "multi U-tube" provides a unit of a thermally conductive polymer through which run four U-shaped channels each providing a closed loop to a heat pump at or above the surface of the ground. Two lumens are shown for each channel because each channel includes fluid that passes 'upward' and also 'downward' through the heat exchange unit, as would be expected for a U-shaped configuration.

The example heat exchange unit shown in cross section, and labeled "Uni-in Multi-out" illustrates an alternative embodiment in which fluid flows down the centre of the unit in a single central channel, but then splits into multiple U-bends arranged radially near the base of the unit (not shown) such that fluid flows upwardly through the plurality of smaller channels on its way to exit the unit at the surface of the ground.

The example heat exchange unit shown in cross-section, and labeled "Coaxial" illustrates an example heat exchange unit in which heat exchange fluid flows down each of eight main channels, but flows upwardly and out of the unit via co-axially arrange channels outside the main channel.

Therefore, regardless of the exact channel configuration within each unit, the channels are optionally U-shaped and each have at least a portion with a diameter of from 1-20 mm or from 1 mm to 10 mm, or from 2 mm to 8 mm, or from 3 mm to 6 mm. In selected embodiments the channels generally, but not necessarily, have a constant diameter along their length as they run through the polymer block.

Any number of such channels may be incorporated into a heat exchange unit as defined herein. However, from 4 to 12 channels may be included in the unit in a simple manner, some of which may be optionally arranged in parallel along most of their length as they run through the polymer block, each including orifices on an external surface of the polymer block, for entry or exit of the heat exchange fluid. For example, in the embodiment illustrated in cross-section in FIG. 3 and labeled "Multi U-tube", each pair of lumens as shown with a dot or cross may comprise a single channel running through the unit in a U-shaped configuration, in a similar manner to the cross-section A-A' shown in FIG. 1.

In any of the heat exchange units as described, the polymer block may be elongate with a diameter of from 1 cm to 30 cm, or from 1 cm to 15 cm, for insertion into a borehole in the ground. In other embodiments the polymer block may have a diameter of from 4 cm-8 cm.

In still further embodiments the polymer block may have a length of from 1-100 m, with the channels extending within a majority of the length of the polymer block. As discussed, in selected embodiments the lumens of the channels may be arranged in a radially symmetrical manner when the polymer block is viewed in cross-section. Moreover, in selected embodiments the channels in cross-section have a total combined cross-sectional area of from 0.5-15 $cm^2$. In such embodiments, the total combined cross-sectional area may be similar to more traditional borehole/conduit/back-fill arrangements comprising just one or two U-shaped conduits, but with the cross-sectional area essentially divided between more than two channels or channels running through the polymer block.

The inventors have performed detailed 30 year annual simulations to show the energy efficiency and heat exchange unit size reduction opportunities for a unit comprising multiple U-shaped channels (e.g. 'mini'-channels) not necessarily within a polymer block (see figures). For this purpose a direct expansion ground-source heat pump comprising the unit, and carbon dioxide as a heat exchange fluid was used to fulfill the cooling and heating load requirements of a single family building located in Montreal. Comparisons were made against an air source heat pump using R410A.

Figure 4:
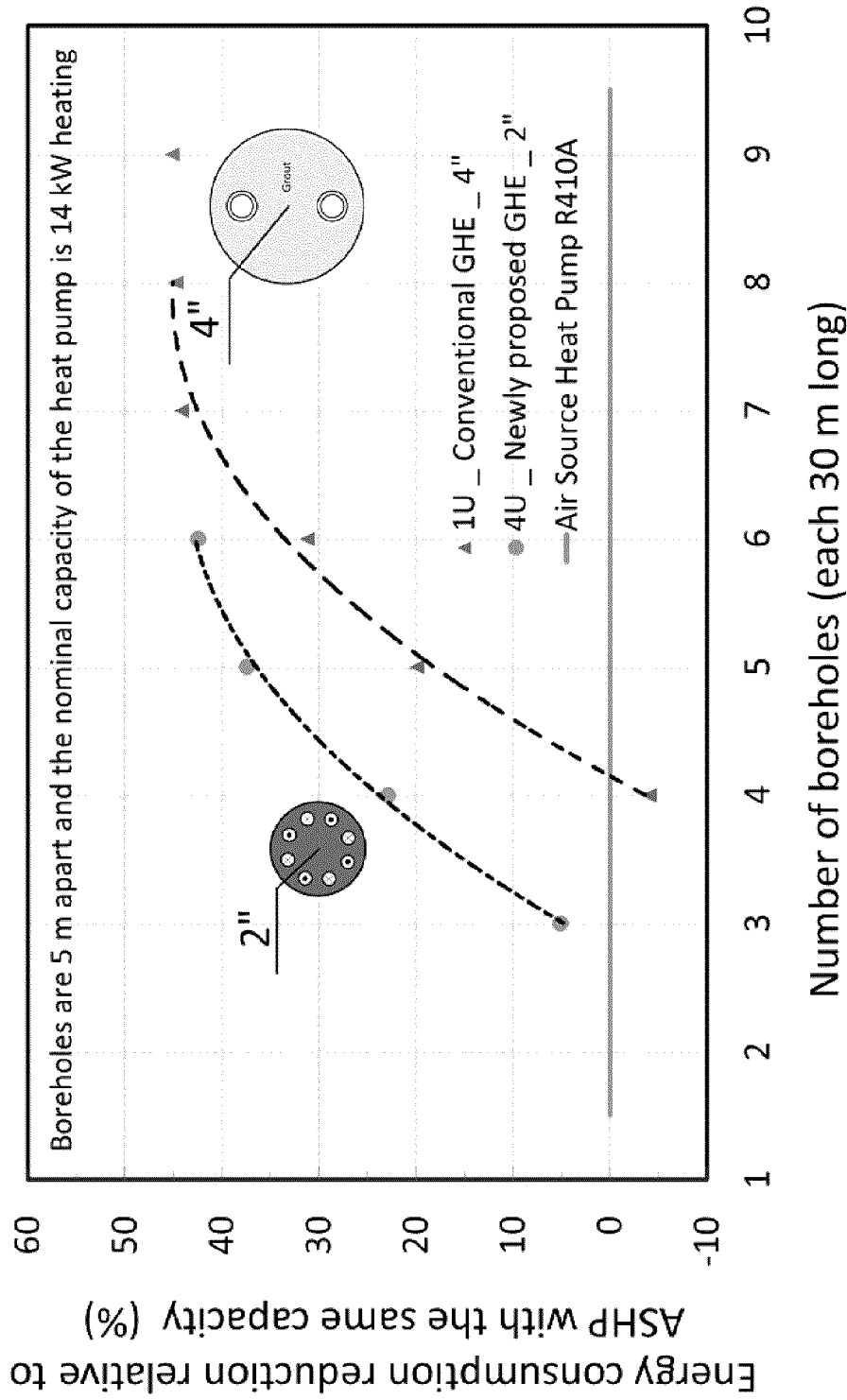
FIG. 4 provides a graph to illustrate a comparison between the performance of a conventional air-source heat pump, a conventional ground source heat pump, and a ground source heat pump comprising an example heat exchange unit as herein described.

FIG. 4 illustrates the energy consumption reduction for the geothermal system in accordance with six variations of the embodiments shown in FIG. 3, relative to the air source heat pump of the prior art-type system with the same nominal capacity. The use of the various embodiments achieved a decrease in energy consumption relative to the prior art system by 40%. Manufacture and installation costs for the various embodiments are estimated as little as one quarter as those of a convention geothermal system, with the conventional geothermal system operation with 20-45% less efficiency.

Figure 5:
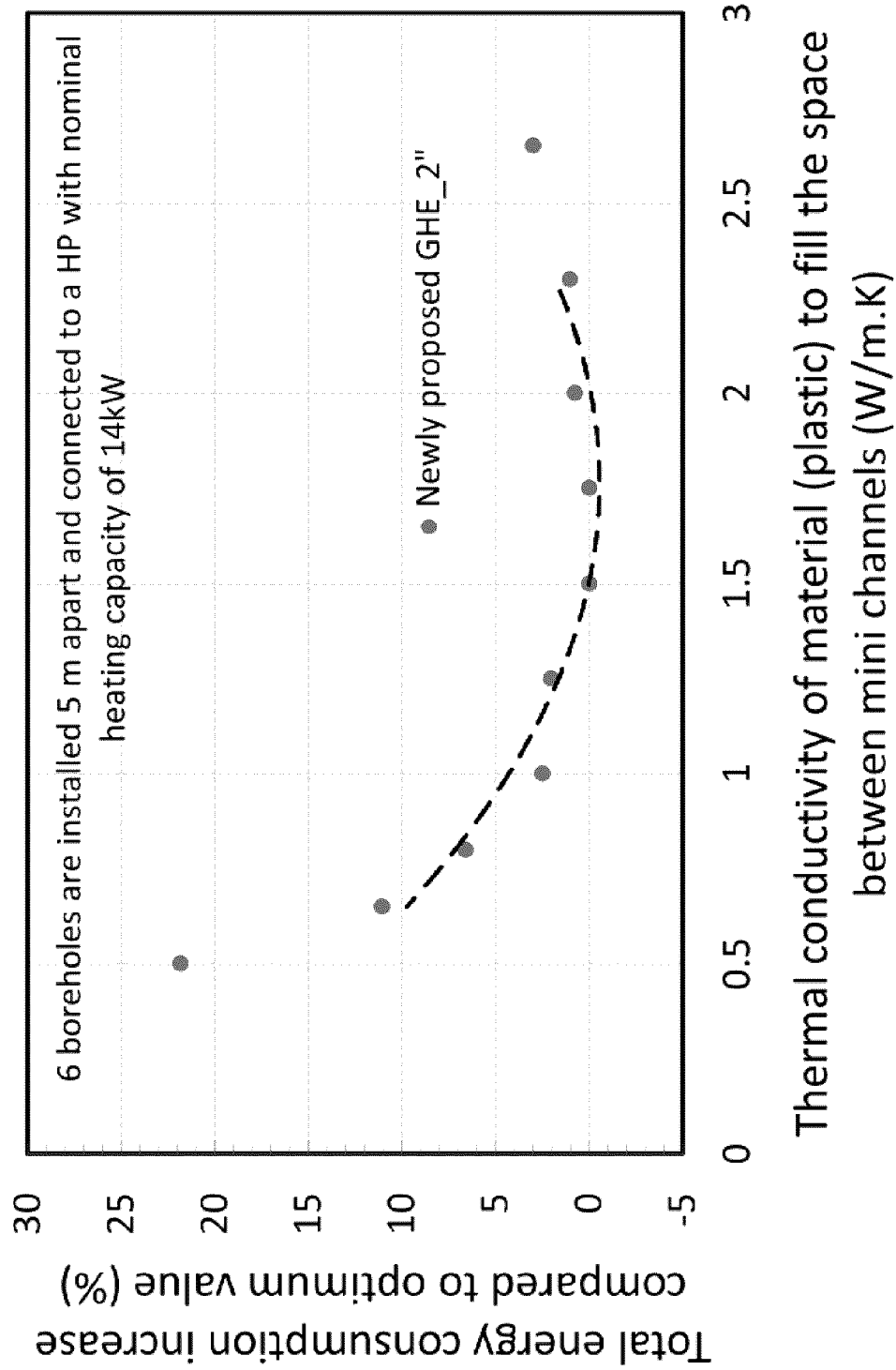
FIG. 5 provides a graph to illustrate a study to assess optimal thermal conductivity of polymer materials in example thermal exchange units as herein described.

FIG. 5 illustrates a study performed to determine the optimal thermal conductivity of the tested materials. Optimum thermal conductivity values depend on many factors including the ground thermal conductivity, building load for heating/cooling, and borehole dimensions. For a ground thermal conductivity of 2.5 W/m·K, 4 mm channel internal diameter, 30 m heat exchange unit length and the 2 inch diameter heat exchange unit with four U-shaped channels, an optimal thermal conductivity of 1.5 W/m·K was calculated at which the geothermal system/ground source heat pump operates with minimum energy consumption. Polymer materials for the heat exchange units with higher or lower thermal conductivity than optimal value (1.5 W/m·K) may increase total energy consumption of the system significantly.

Further embodiments provide for a geothermal heat exchange system, comprising:

one or more subterranean heat exchange units as defined herein;

supply and return conduits connected to the unit(s) for fluid flow between the channels of the unit(s) and the conduits;

heat exchange fluid located within the channels of the unit(s), and the conduits;

a pump to pump the heat exchange fluid to and from the unit via the conduits to and from a heating/cooling load in a loop.

In selected embodiments the geothermal heat exchange systems as described herein are direct-expansion geothermal heat exchange systems, the heat exchange fluid adopting liquid and gaseous states at different positions within a loop or loops (e.g. a closed loop or loops). In some such embodiments, the heat exchange fluid comprises carbon dioxide, which may be particularly suited the geothermal heat exchange systems and subterranean heat exchange units as defined herein. With heat exchange fluids such as carbon dioxide, which can be used for direct expansion, two-phase fluid circulation in a closed system, thermal energy transfer may depend more heavily upon phase transition of the fluid rather than fluid temperature, such that heat exchange fluid in the loop may vary only by less than 2 degrees C., as the fluid circulates around the loop. This in turn may help reduce or eliminate negative thermal interactions between channels, particularly adjacent channels, in the system. Moreover, carbon dioxide offers an environmentally friendly and energy efficient heating and cooling solution with relatively inexpensive ground loop installation within the systems and units herein described.

As discussed, some studies have shown that the use of more than two conventional U-shaped conduits within a borehole for geothermal heat exchange purposes can lead to negative thermal interaction between the conduits particularly in relatively small borehole diameters leading to higher energy consumption for circulating the heat exchange fluid. However, the by using carbon dioxide in a two-phase, direct expansion closed loop, wherein the closed loop includes the subterranean heat exchange unit as herein described, significant advantages can be realized. For example, heat energy transfer to and from the heat exchange unit may occur without significant changes in temperature of the heat exchange fluid less than 5 degrees C., or even less than 2 degrees C. (carbon dioxide) thus resulting in greatly reduced negative thermal interaction between the channels or channels in the heat exchange unit. Furthermore, carbon dioxide is particularly suited for use with the heat exchange units as herein described due to its low kinematic viscosity and surface tension, such that the pressure drop upon phase transfer within the closed loop is significantly lower (up to 5-7 times lower than conventional refrigerants), resulting is a greater efficiency of energy transfer compared to the use of other heat exchange fluids in the discussed heat exchange unit. Therefore, the physical qualities of carbon dioxide may be particularly suited for selected heat exchange units that are 4 cm to 8 cm in diameter as herein described, that comprise a plurality of U-shaped channels or channels that are from 0.5-20 mm in diameter.

In conventional geothermal systems that comprise conduits or pipes positioned down larger diameter boreholes, the use of multiple U-shaped conduits or pipes within the same borehole can have negative consequences, including negative thermal interaction between conduits, and the possible need for even larger boreholes (with greater drilling costs). Moreover, the use of multiple conduits will lead to a pressure drop within the closed loop unless greater power is used for pumping, in order to maintain fluid pressure and movement within the conduits. However, the geothermal systems as herein described, at least in selected embodiments, employ a unique combination of direct expansion, carbon dioxide as the heat exchange fluid, and the use of novel subterranean heat exchange units or other arrangements comprising multiple channels or channels therethrough (sometimes termed 'mini-channels'), each of which has a much smaller diameter of 0.5 mm to 20 mm, compared with those of convention geothermal systems. These features, for example, may lead to especially preferential results. A greater thermal resistance reduction is achieved due to the provision of smaller channels or conduits with a greater surface area of contact between the fluid and the polymer of the polymer block, optionally located closer to the proximity of the external boundary of the polymer block, and thus closer to the surrounding subterranean material for thermal energy transfer. This arrangement, in turn, can provide for a 10-25% or more reduction in the required length of the heat exchange units, and in turn a corresponding reduction on the length of the required boreholes to accommodate the units.

In addition, due to smaller pressure changes as the fluid within the closed loop enters and exits the channels or channels within the heat exchange unit, phase transition of the carbon dioxide may be achieved within the closed loop within little or no change in temperature of the heat exchange fluid. This in turn further minimizes any negative thermal interaction between the thermal exchange fluid in adjacent channels or channels of the thermal exchange unit or other arrangement, permitting the option of denser clustering of multiple U-shaped channels or conduits within the polymer block, or within a borehole.

Further Examples

Figure 6A:
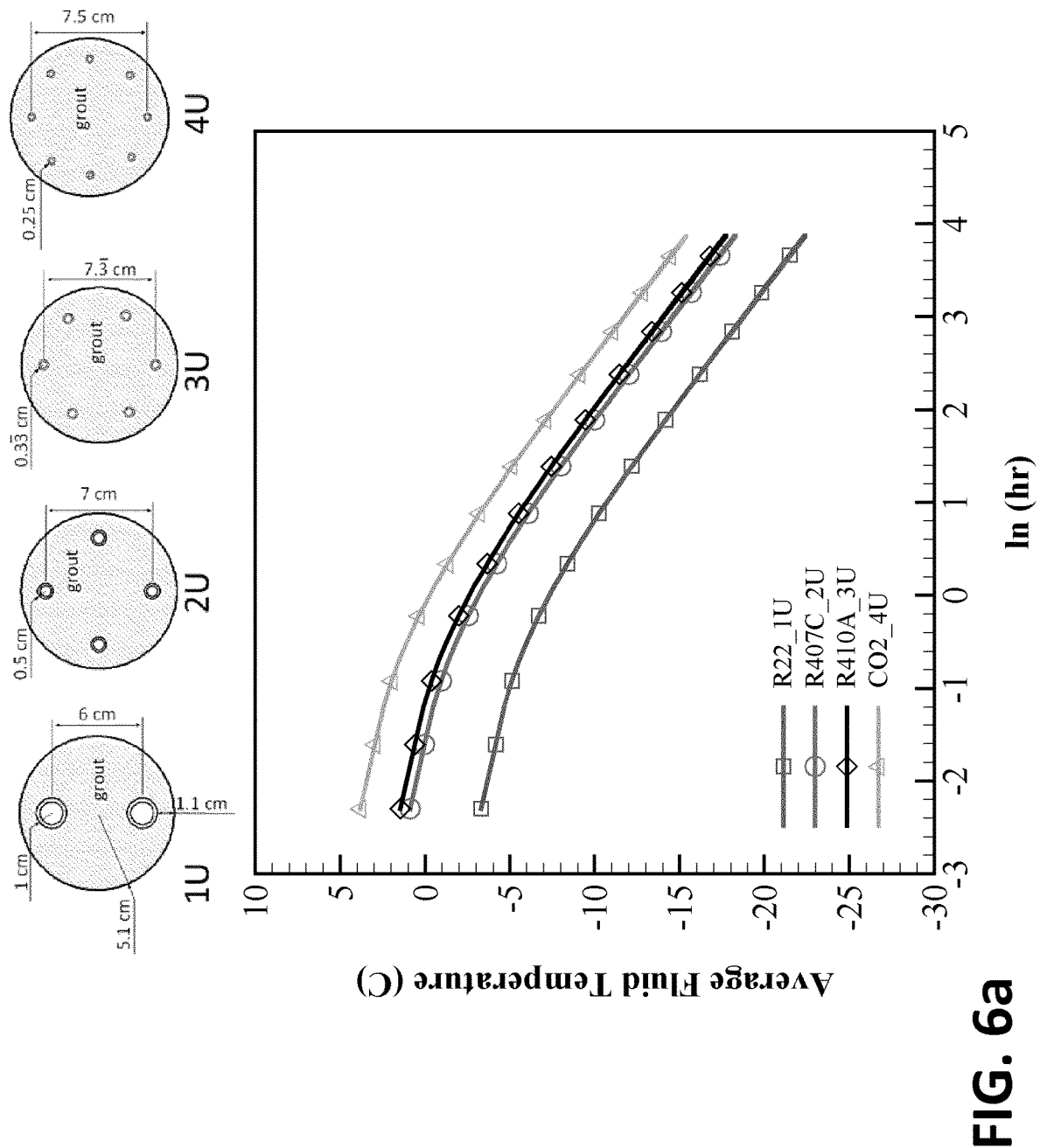
FIG. 6a provides a graph to illustrate average fluid temperature as a function of time in a logarithmic scale, for a comparison between different conduit configurations comprising different numbers of U-shaped conduits using carbon dioxide and other fluids as thermal exchange fluids.
Figure 6B:
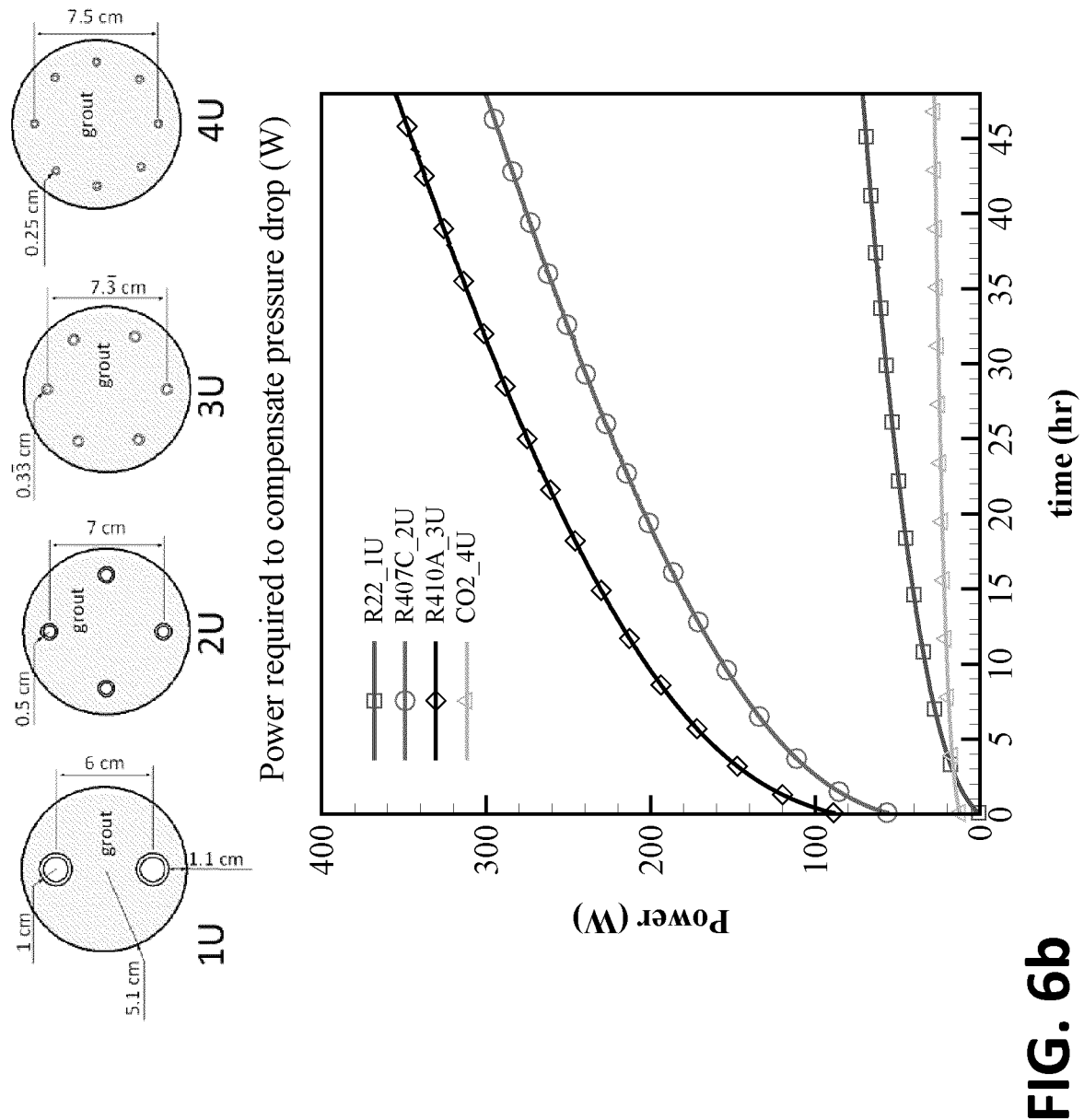
FIG. 6b provides a graph to illustrate power required to compensate for pressure drop as a function of time, for a comparison between different conduit configurations comprising different numbers of U-shaped conduits using carbon dioxide and other fluids as thermal exchange fluids.

The inventors have conducted further detailed studies based upon theoretical response tests to compare and evaluate the thermal performance and pressure drops for selected geothermal systems that employ carbon dioxide as a thermal exchange fluid, with either 1, 2, 3 or 4 U-shaped conduits this time embedded in grout. With reference to FIGS. 6a and 6b, right side, cross-sections of the heat exchange conduit configurations are shown, with conduits arranged in a radially symmetrical manner with twice the conduit lumens shown compared to the number of conduits because each conduit passes twice ("upwards" and "downwards") through the schematic borehole in its U-shaped configuration. In this example, the total internal surface area of the conduits was maintained generally constant across the examples regardless of the number of U-shaped conduits present. For example, it may be noted that the single conduit shown as "1U" in the right panel of FIGS. 6a and 6b has a cross-sectional radius of 1 cm, whereas each of the two conduits shown "2U" has a cross-sectional radius of 0.5 cm. For three conduits ("3U") the cross-sectional radius of the conduits is even smaller at 0.33 cm, whereas for four conduits ("4U") the cross-sectional radius of the conduits is 0.25 cm. Thus, based upon simple math ($2\pi r \times length$) the total internal surface areas of the lumens of the conduit or conduits present is generally constant across the presented examples.

The graph shown in FIG. 6a illustrates that, under identical heat extraction rates, inlet and outlet vapour quality and total conduit surface areas, the use of multiple U-shaped conduits in this case combined with carbon dioxide as the thermal exchange fluid correlated with higher thermal exchange fluid temperatures that imply higher thermal performance.

The graph shown in FIG. 6b illustrates that the power consumption required to compensate for a thermal exchange fluid pressure drop in the various conduit/thermal fluid combinations. Interestingly, with the system comprising 4 conduits in a U-shape configuration, with carbon dioxide as the thermal exchange fluid, 3 to 15 times less power was required compared to other fluid/conduit configurations to compensate for the pressure drop.

Figure 7A:
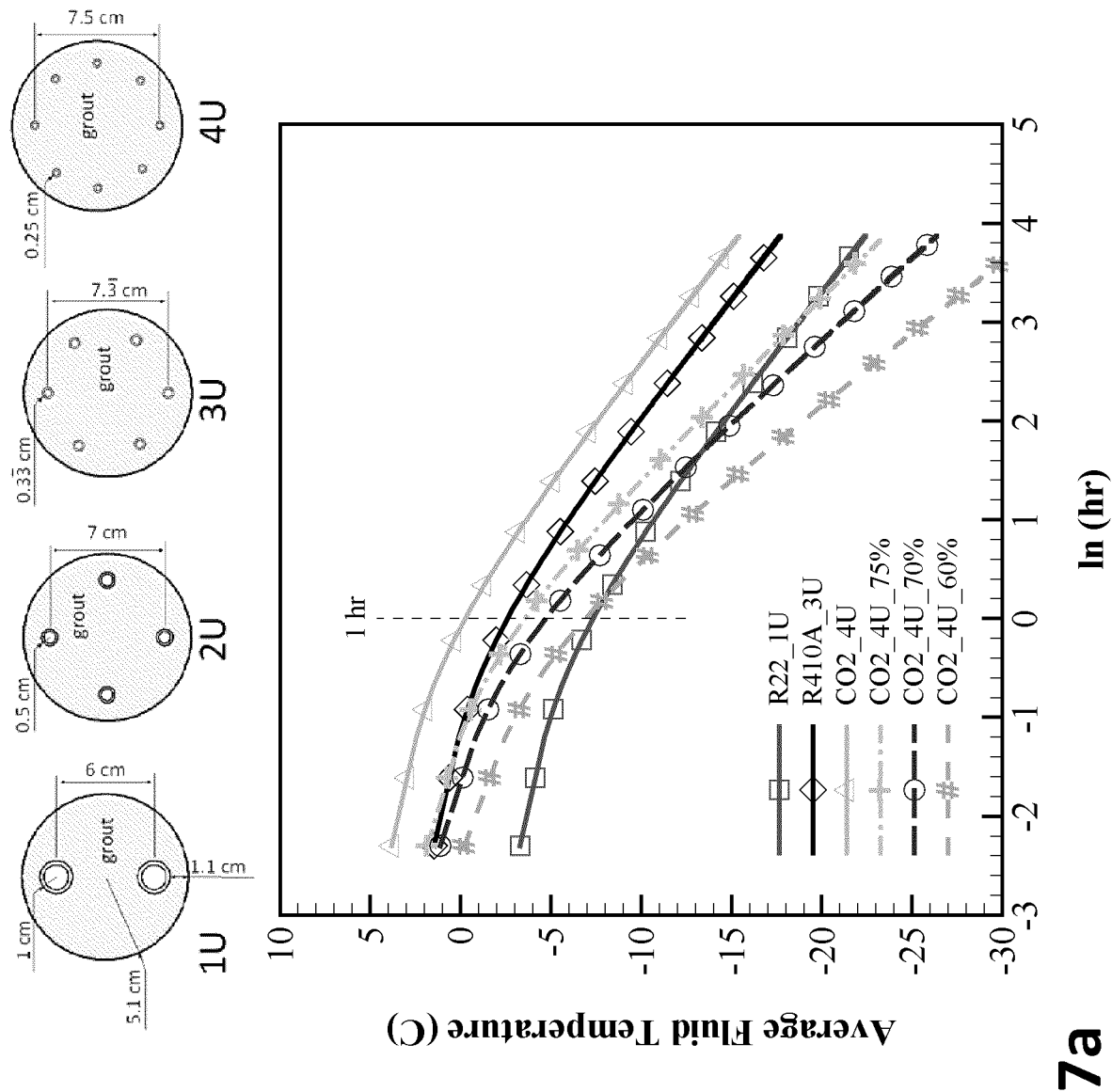
FIG. 7a provides a graph to illustrate average fluid temperature as a function of time in a logarithmic scale, for a comparison between different conduit and thermal exchange fluid configurations, particularly for configurations comprising 4 U-shaped conduits with carbon dioxide as a thermal exchange fluid with variable reductions in heat exchange unit length.

Further studies were conducted to check whether conduit (and thus borehole) length reductions are feasible without significant loss of performance for various conduit/fluid combinations. FIG. 7a provides a graph to illustrate an evaluation of length reductions by 25%, 30% and 40% (indicated respectively by an indication of 75%, 70% and 60% of the original length in the FIG. 7a graph legend). Results for a configuration with 4 U-shaped conduits, with carbon dioxide as a thermal exchange fluid, show that for a shorter term operation similar results can be achieved with a 40% reduction in length, whereas for a longer term operation a 20-25% length reduction is still feasible. Moreover, as shown in FIG. 7b, the power requirements to compensate for pressure drop for the configuration with 4 U-shaped conduits and carbon dioxide as a thermal exchange fluid, is typically less than half that required for a single U-shaped conduit configuration with R22.

In sum, these examples illustrate the importance of selecting appropriate conduit sizes and configurations to match the use of, for example, carbon dioxide as a working fluid. Otherwise geothermal systems may perform sub-optimally, or conduit lengths and boreholes may be unnecessarily long and expensive to install, for a commensurate gain in system performance.

Figure 8:
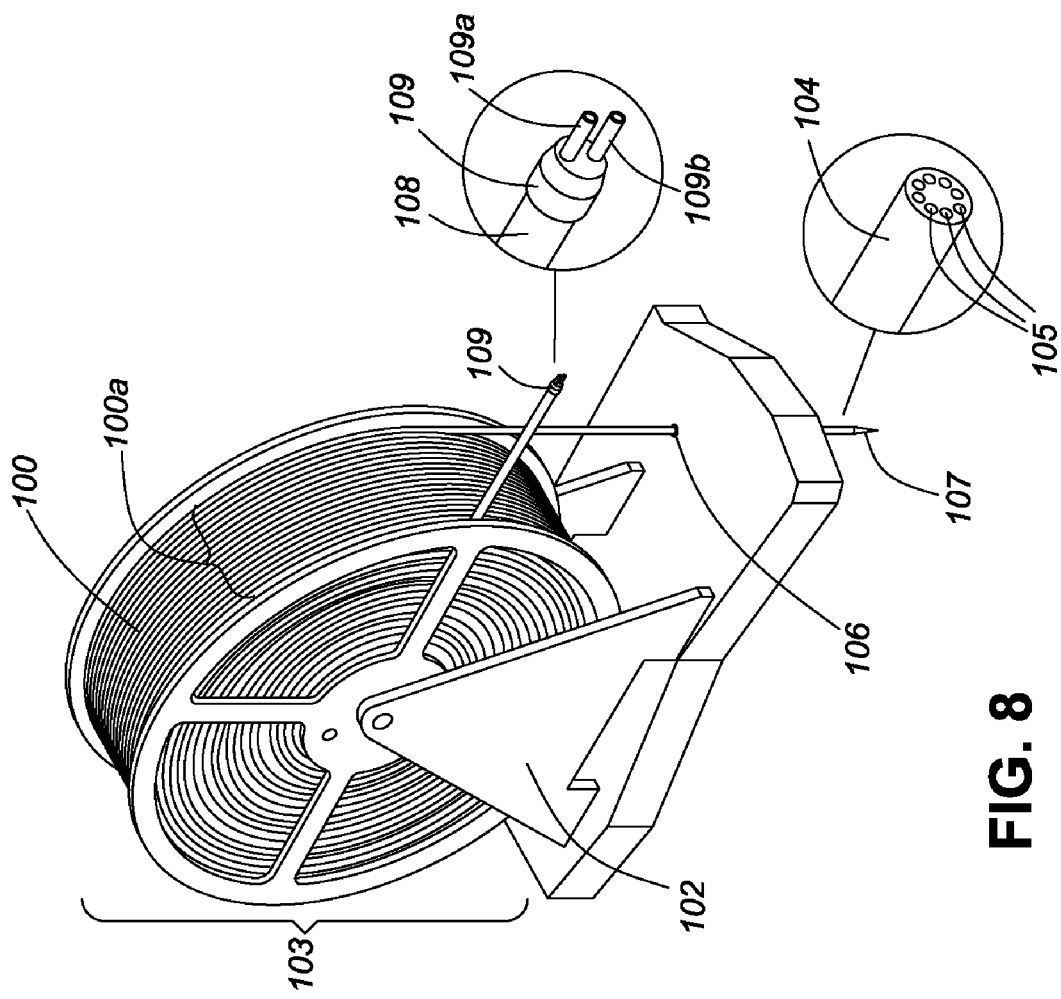
FIG. 8 provides a front-side perspective view of an example heat exchange unit, comprising a polymer block wound onto a spool, with one end of the polymer block comprising means to connect channels within the polymer block to supply and return conduits.

FIG. 8 illustrates one example embodiment of a heat exchange unit as disclosed herein, comprising an elongate polymer block that is in a form suitable for transportation to a site for installation of a geothermal system. The polymer block 100 comprises a flexible polymer such that the polymer block appears to have a hose-like or pipe-like elongate appearance or configuration, and is wound so as to form multiple spools 100a of polymer block arranged onto a spool frame; the spool frame itself comprising a base portion 102 and a spool wheel 103. In this way, the arrangement somewhat resembles a hose that is spooled for storage. The polymer block 100 includes elongate channels extending therethough in a radially symmetric manner when the polymer block is viewed in cross-section (not shown, but the ends of the channels 105 are visible in the enlarged drawing of first end 104 of polymer block 100). The first end 104 is illustrated extending under (or being inserted into) the surface of the ground, into a borehole 106 drilled into the ground (not shown) such that turning of the spool wheel 103 causes the first end 104 to be inserted into the borehole, and the end moves deeper into the borehole until it reaches a desired depth.

First end 104 may already comprise elongate channels that include U-shaped portions. However, if not then first end 104 may optionally be fitted with an end-cap 107 that as shown may serve three purposes: (1) it protects the first end 104 from being damaged as the end is fed into the borehole, (2) it may be shaped as a point to assist the passage of the first end 104 of the polymer block down into the borehole, and (3) the end-cap may itself include U-shaped channels each for alignment with, and sealing fluid connection to, two of the elongate channels running through the polymer block, such that the two channels in the polymer block become fluidly connected at one end (the lower end) into a continuous channel running the length of the polymer block, with a U-shaped bend at its lowest position in the borehole, at the first end 104 of the polymer block. Therefore, end-cap 107 provides the option that the first end 104 of the polymer block can be formed by cutting the polymer block to expose a cross-section of the polymer block and to expose channels 105 similar to that shown in the enlargement of first end 104. Subsequent proper fitting of the end-cap 107 creates the U-shaped portion of the channels thereby to complete the elongate U-shaped channels suitable for receiving heat exchange fluid. During operation of the heat exchange system, the fluid will be forced into an entrance for each elongate U-shaped channel thus formed, down to the first end 104 of the polymer block 100, through the U-shaped portions (not shown) formed within end-cap 107, and back up the return side of the channel.

Second end 108 of the polymer block 100 is for connection to supply and return conduits of a geothermal heat exchange system. In the embodiment illustrated, conduit-connection cap 109 is shown fitted tightly to second end 108 of polymer block 100, and comprises supply conduit connection 109a and return conduit connection 109b. In this way, supply and return conduits (not shown) may be tighty fitted or clamped onto the conduit connections 109a and 109b of the conduit-connection cap 109. Although the internal configuration of conduit end-cap 109 is not shown, it will be readily apparent that the cap may be internally configured to include internal channels for sealing fluid connection with each of the channels 105 within polymer block 100, thus to combine the flow of heat exchange fluid either being suppled to the polymer block 100 via supply conduit connection 109a, as well as returning from the polymer block 100 via return conduit connection 109b. In this way, the conduit-connection cap 109 enables fluid connection to the multiple channels in the polymer block by way of a single supply conduit and a single return conduit for heat exchange fluid.

Therefore, with further reference to FIG. 8, a method of borehole, site-installation of a heat exchange unit as described herein becomes readily apparent. Such a method may include the following steps:

providing a heat exchange unit as described herein, spooled onto a spool;

optionally and if required, applying an end-cap to a first end of the polymer block, the end cap comprising channels for alignment with the channels of the polymer block, with U-shaped portions to provide fluid connection of the channels of the polymer block, thereby to form elongate U-shaped channels;

inserting the first end of the polymer block down into a borehole at the site to a desired depth;

if necessary cutting the elongate polymer block above the ground;

connecting a second end of the polymer block to supply and return conduits of a heat exchange system, optionally by way of a conduit-connection cap.

Whilst various embodiments are herein described for various heat exchange units, arrangements, and systems, with corresponding methods and uses, all such embodiments are merely exemplary and in no way intended to limit the scope of the invention, nor the scope or interpretation of the appended claims.

The invention claimed is:

1. A subterranean heat exchange unit adapted for fluid connection to supply and return conduits containing a heat exchange fluid in a loop of a geothermal heat exchange system, the heat exchange unit comprising an elongate polymer block comprising a polymer material with a plurality of elongate channels defined by and extending within the polymer material of the elongate polymer block, with the polymer material of the elongate polymer block extending between the elongate channels within the elongate polymer block, each channel having a diameter of from 0.5mm to 20mm, each channel adapted for passage therethrough of the heat exchange fluid to and from the supply and return conduits.

2. The subterranean heat exchange unit of claim 1, wherein the elongate channels include a U-shaped portion through the polymer block, and each have a diameter of from 2mm to 8mm.

3. The subterranean heat exchange unit of claim 1, wherein the channels are tubular passages that are circular in cross-section with a constant diameter along their length.

4. The subterranean heat exchange unit of claim 1, comprising from 4 to 12 channels for heat exchange fluid, a portion of which run in parallel through at least most of the length of the elongate polymer block, each ending in an orifice in a surface of the elongate polymer block for entry or exit of the heat exchange fluid to and from the elongate polymer block.

5. The subterranean heat exchange unit of claim 1, wherein the elongate polymer block has an average diameter of from 1cm to 15cm, for insertion into a borehole in ground, the elongate channels extending at least substantially along a length of the polymer block.

6. The subterranean heat exchange unit of claim 1, wherein the elongate polymer block has an average diameter of 4cm to 8cm.

7. The subterranean heat exchange unit of claim 1, wherein the polymer block has a length of 1m to 100m, with the channels for heat exchange fluid extending within at least a majority of the length of the elongate polymer block.

8. The subterranean heat exchange unit of claim 1, wherein the channels are arranged in a radially symmetrical manner when the elongate polymer block is viewed in cross-section.

9. The subterranean heat exchange unit of claim 1, wherein the channels in cross-section have a total combined cross-sectional area of 0.5 cm$^2$ to 15cm$^2$.

10. The subterranean heat exchange unit of claim 1, wherein the polymer material of the elongate polymer block comprises or consists of a polymer with a thermal conductivity of from 1.0 to 10 W/m.K.

11. The subterranean heat exchange unit of claim 1, wherein the elongate polymer block comprises a flexible polymer, the subterranean heat exchange unit can be wound or coiled for transport or storage prior to installation.

12. The subterranean heat exchange unit of claim 1, wherein each of the elongate channels within the elongate polymer block has an entry and exit point for the heat exchange fluid at a first end of the elongate polymer block, each elongate channel having a U-shaped portion within the elongate polymer block at a second end thereof.

13. The subterranean heat exchange unit of claim 1, wherein the elongate channels extend a length of the elongate polymer block, with exit orifices for each channel at opposite ends of the elongate polymer block, the subterranean heat exchange unit further comprising an end cap fitted at one end of the elongate polymer block, the end-cap comprising U-shaped channels each to provide sealing fluid connection between two exit orifices of two elongate channels at the one end, thereby to complete elongate channels each with a U-shaped portion and each with heat exchange fluid entry and exit points at an end of the elongate polymer block opposite the end with the end-cap.

14. The subterranean heat exchange unit of claim 1, further comprising a conduit connection cap fitted to an end of the elongate polymer block, for sealing fluid connection between exit orifices of the elongate channels to conduits, and comprising conduit connection points.

15. A geothermal heat exchange system, comprising:
a subterranean heat exchange unit according to claim 1, supply and return conduits connected to the unit for fluid flow between the channels of the unit and the conduits;
heat exchange fluid located within the channels of the unit(s), and the conduits;
a pump or compressor to pump or circulate the heat exchange fluid to and from the unit via the conduits to and from a heating / cooling load in a loop.

16. The system of claim 15, wherein the system is a direct-expansion geothermal heat exchange system, the heat exchange fluid comprising a two-phase heat exchange fluid that adopts liquid and gaseous states at different positions within the loop of the system.

17. The system of claim 15, wherein the temperature of the heat exchange fluid increases or decreases by less than 5 degrees C. as the fluid cycles around the loop.

18. The system of claim 15, wherein the heat exchange fluid comprises carbon dioxide.

* * * * *